United States Patent

[11] 3,557,977

[72] Inventors Wayne G. Atwater
Willoughby;
Sanford Saul, Cleveland, Ohio
[21] Appl. No. 769,801
[22] Filed Oct. 23, 1968
[45] Patented Jan. 26, 1971
[73] Assignee The Triax Company
Cleveland, Ohio
a corporation of Ohio

[54] LOAD DETECTING DEVICE FOR WAREHOUSING SYSTEM
17 Claims, 9 Drawing Figs.

[52] U.S. Cl. .......... 214/16.4
250/224
[51] Int. Cl. .......... B65g 1/06
[50] Field of Search .......... 214/16.4, 16.42; 250/220, 221, 224, 234; 209/(Inquired)

[56] References Cited

UNITED STATES PATENTS

| | | | |
|---|---|---|---|
| 1,896,830 | 2/1933 | Scharff | 250/234X |
| 2,508,116 | 5/1950 | Kutchukian | 250/224 |
| 2,941,738 | 6/1960 | Burke et al. | 214/16.4(2) |
| 3,224,319 | 12/1965 | Robert et al. | 250/234X |
| 3,235,740 | 2/1966 | Rottmann | 250/224X |
| 3,282,419 | 11/1966 | Rock | 250/224 |
| 3,297,379 | 1/1967 | Artaud | 214/16.4(2)X |
| 3,389,814 | 6/1968 | Lemelson | 214/16.4(2)X |
| 3,476,947 | 11/1969 | Burney | 250/224 |

*Primary Examiner*—Gerald M. Forlenza
*Assistant Examiner*—Raymond B. Johnson
*Attorney*—Baldwin, Egan, Walling & Fetzer

ABSTRACT: A warehousing system comprising a storage frame with a plurality of load storage locations in said storage frame and with a powered load carrier adapted for inserting loads into and removing loads from the storage locations. The load carrier includes an extractor mechanism for handling loads at the selected storage location, and load detection means is provided on the load carrier for determining if a selected storage location is occupied by a load, prior to the actuation of the extractor mechanism for placing a load carried thereby into the selected storage location. Such load detection means comprises a movable support member adapted for movement from an inactive position where it is out of coaction with the storage frame to an active position where it is disposed beneath the selected storage location in the storage frame, and energy beam sensing means coacting with the movable support member in the active position of the latter, for checking to see if a load is already in the selected storage location. If no load is in the selected storage location, the energy beam sensing means is energized causing actuation of the extractor whereby the load is deposited in the selected storage location. If the energy beam sensing means is maintained deenergized by a load already in the selected storage location, then the extractor mechanism is prevented from becoming actuated, and in the embodiment illustrated, the load carrier is returned to its starting position.

INVENTORS
WAYNE G. ATWATER
SANFORD SAUL
BY
Baldwin, Egan, Walling & Fetzer
ATTORNEYS INVENTORS
WAYNE G. ATWATER
SANFORD SAUL
BY
Baldwin, Egan, Walling & Fetzer
ATTORNEYS

LOAD DETECTING DEVICE FOR WAREHOUSING SYSTEM

SPECIFICATION

This invention relates in general to automatic warehousing and more particularly to automatic warehousing wherein the load carrier includes load detecting means for determining if a load already occupies a selected load storage location to which the load carrier has been programmed for depositing a load. If the detecting means determines that a load is already in the selected load storage location, then the load carrier is prevented from attempting to insert the load thereon into the selected storage location.

Various arrangements are known in the art for detecting an already filled load storage location, in automatic warehousing systems. Some examples of these prior art mechanisms are shown for instance in U.S. Pat. No. 3,132,753 issued May 12, 1964 to A. R. Chasar, et al., and entitled Load Transfer and Storage Apparatus and Control Means Therefor, and U.S. Pat. No. 3,389,814, issued June 25, 1968 to J. H. Lemelson and entitled Load Responsive Control Means for Material Handling Apparatus.

In U.S. Pat. No. 3,132,753 a mechanical plunger sensing device is disclosed which is physically actuated upon engagement of the plunger device with a load already in the selected storage location when the load carrier attempts to deposit another load therein. However, in the event that the load already in the storage bin has an irregular shaped or poorly positioned load surface that must be contacted by the mechanical sensing device, the sensing device sometimes becomes damaged or fails to operate properly, and thus a collision occurs between the load already in the selected load storage location and the extractor and/or load supported thereon, as the extractor attempts to place the load in the occupied storage location.

Photocell sensing devices generally operate on the basis that the extractor actuation of the load carrier for depositing a load in a selected storage location is prevented when a reflection signal occurs occasioned by a load already occupying the selected storage location. However, should a photocell light source burn out or get out of alignment, no signal ordinarily is generated, and therefore, the extractor operates even though the storage location is already filled, resulting in a collision.

The present invention provides the load carrier in an automatic warehousing system with an energy beam load detecting mechanism for permitting load depositing actuation of the extractor of the load carrier after the latter has moved to a selected load storage location in the warehousing complex, only when the energy beam is received by the energy beam sensor of the detecting mechanism, and which can occur only when the selected load storage location is empty. The load detecting means includes a member movable from an inactive position into an active position under the selected load storage location or bin, with such movable means in said active position being adapted for coaction with the energy beam sensing means for checking to see if a load is already in the load storage location. If no load is in the selected load storage location, the energy beam is received by the sensing means and which causes actuation of electro responsive means in the control circuit of the extractor for permitting load depositing energization of the extractor and thus storing of the load in the selected load storage location.

Accordingly, an object of the invention is to provide an automatic warehousing system having a novel load detecting means for determining if a load is already stored in a selected storage location in the system.

A further object of the invention is to provide a system of the above discussed type which includes a movable load carrier for inserting loads into and removing loads from the storage framework of the system, and wherein the load detecting means includes a movable member mounted on the load carrier for movement from an inactive position to an active position wherein it extends into the storage structure of the system, and wherein the load carrier is prevented from storing a load in the storage structure in the event that the load detecting means in said active position of said member signals that a load is already stored in the selected storage location.

A still further object of the invention is to provide a system of the above discussed type wherein the load carrier commences its movement with respect to the warehousing complex from a starting position and wherein control means are provided for causing automatic return of the load carrier to the starting position, in the event that the load detecting mechanism indicates that a load is already stored in the selected storage location.

A still further object of the invention is to provide a warehousing system of the above discussed type wherein the load carrier includes a horizontally movable conveyor portion, an elevator portion movable vertically on the conveyor portion, with a laterally movable extractor portion on the elevator portion, for supporting a load thereon and handling the load at the selected storage location, and wherein the load detecting mechanism includes a movable support means mounted on the elevator portion, and which is movable to an active position into underlying relation with respect to the selected storage location for coaction with an energy beam sensor for determining if a load is already stored in the selected storage location.

A still further object of the invention is to provide a system of the latter discussed type which includes circuit means for controlling the energization of the extractor portion and wherein the extractor portion is prevented from being energized in the event that the energy beam sensor is not actuated due to a load already stored in the selected storage location, and wherein the circuit means then causes the load carrier to return to its starting position.

A still further object of the invention is to provide a system of the aforediscussed type wherein the support means supports a retroreflective disc which is moved into alignment with a light beam projected from a reflex photocell light source mounted on the elevator, and reflects the beam back to the photocell on the elevator along the same axis as the original beam, for indicating that a load is not disposed in the selected storage location, whereupon energization of the extractor portion occurs to deposit the load supported on the extractor portion, into the selected storage location, and wherein the load detecting mechanism can be incorporated into existing warehousing structures without revision of the necessary space in the storage structure for receiving the support means below the respective load storage locations.

Other objects and advantages of the invention will be apparent from the following description taken in conjunction with the accompanying drawings wherein:

FIG. 1 is a fragmentary, broken, diagrammatic, end elevational view of a storage structure or storage frame having an aisle in the middle thereof, and with a load carrier generally aligned with the aisle and movable in the aisle on track means, and with the load carrier being adapted for storing loads in selected storage locations defined by the storage frame; the extractor portion of the load carrier is illustrated in an extended condition;

Figure 3:
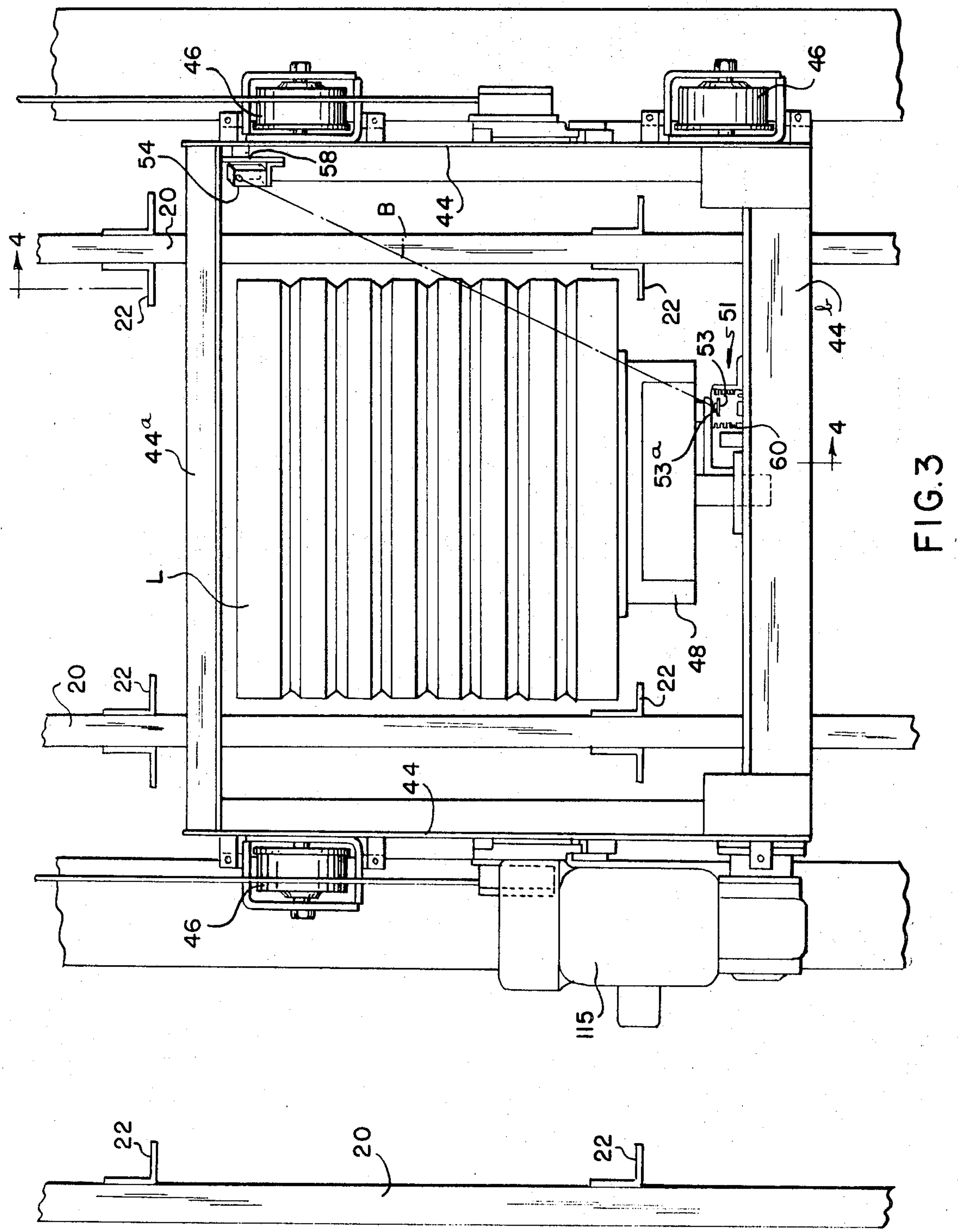
FIG. 3 is an enlarged, fragmentary, side elevational view of the elevator and associated extractor generally similar to that of FIG. 2, but illustrating the energy beam load detecting mechanism mounted thereon, for determining if a load already occupies a selected storage location that the load carrier is programmed for inserting a load thereinto.
Figure 5:
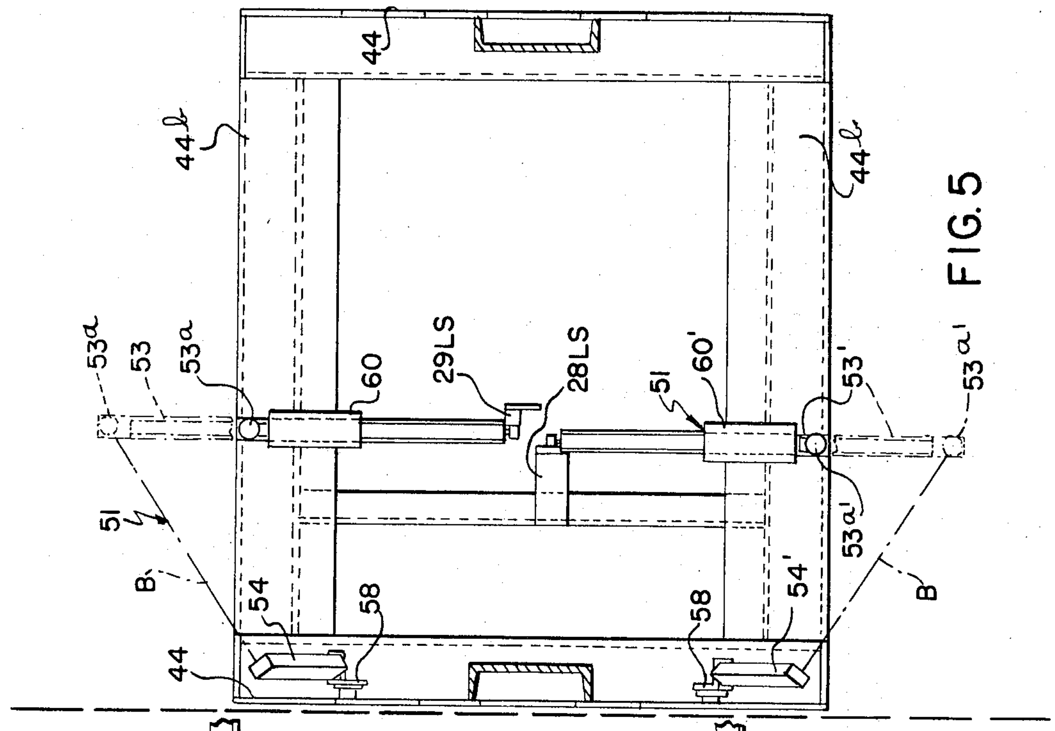
Figure 4:
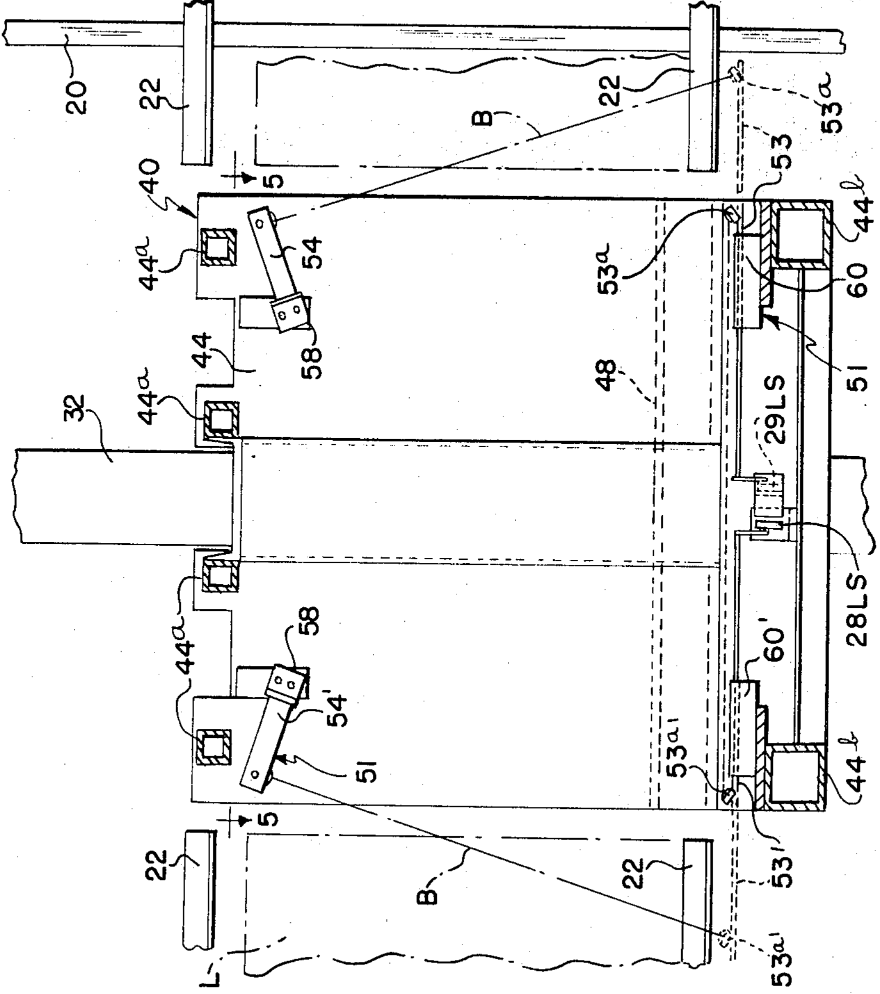
Figure 6:
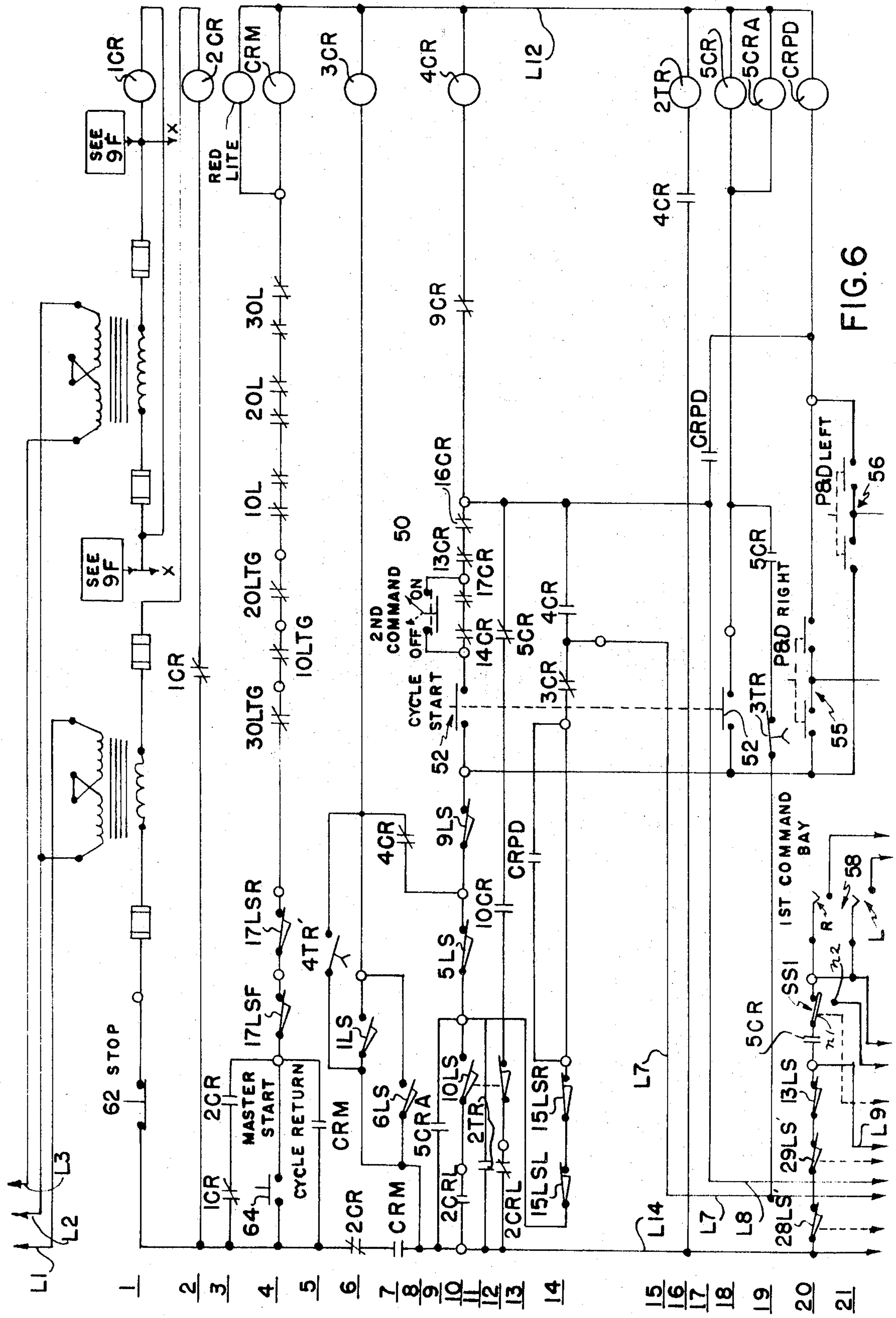
Figure 7:
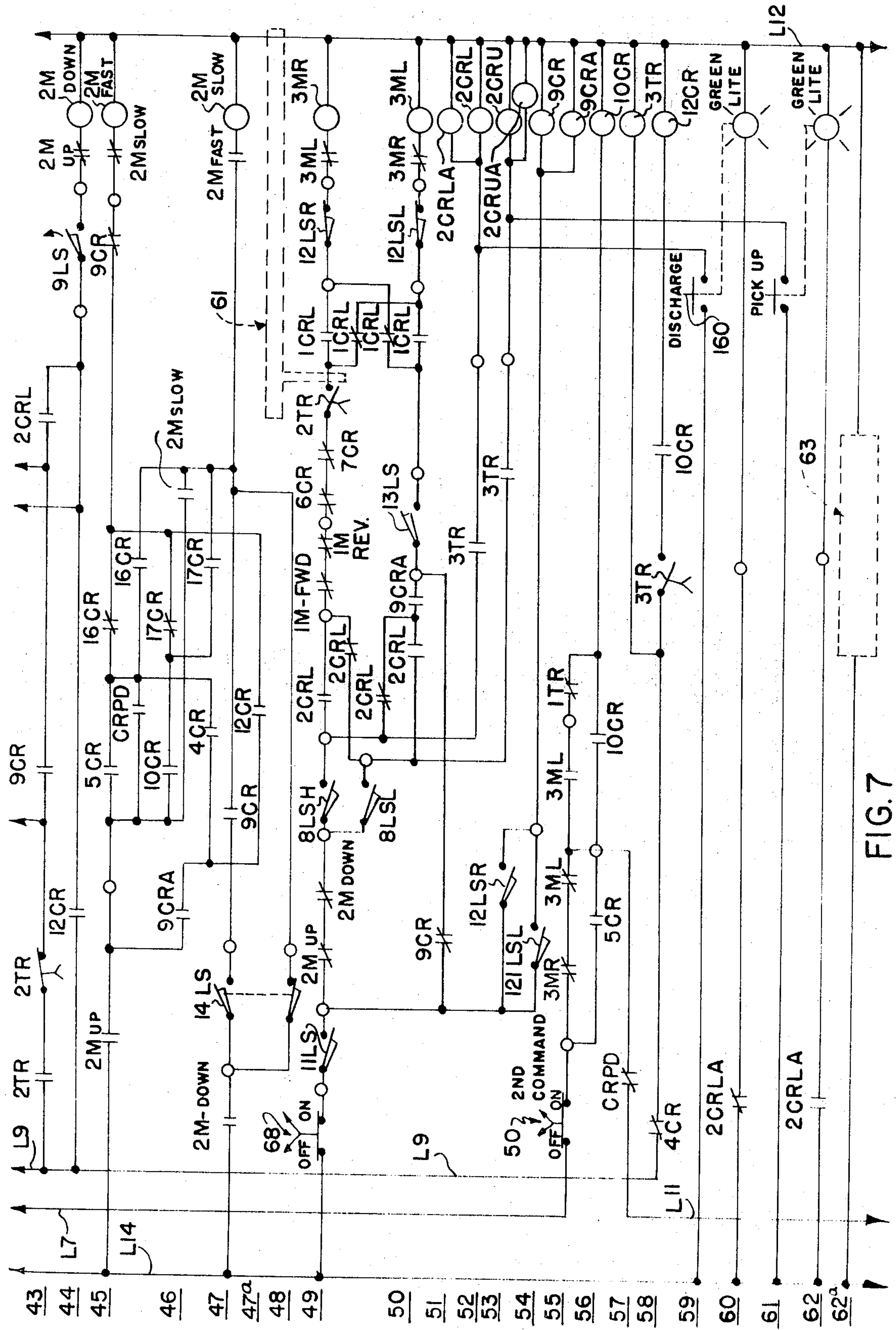
Figure 8:
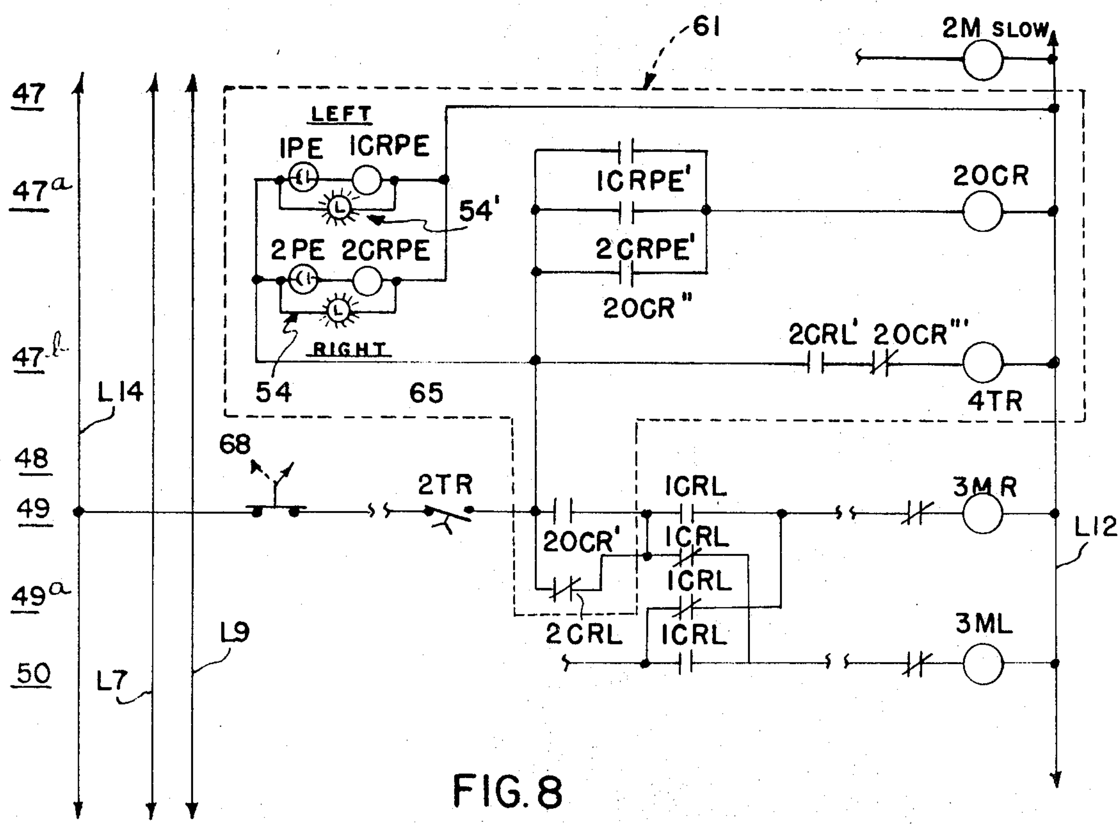
Figure 9:
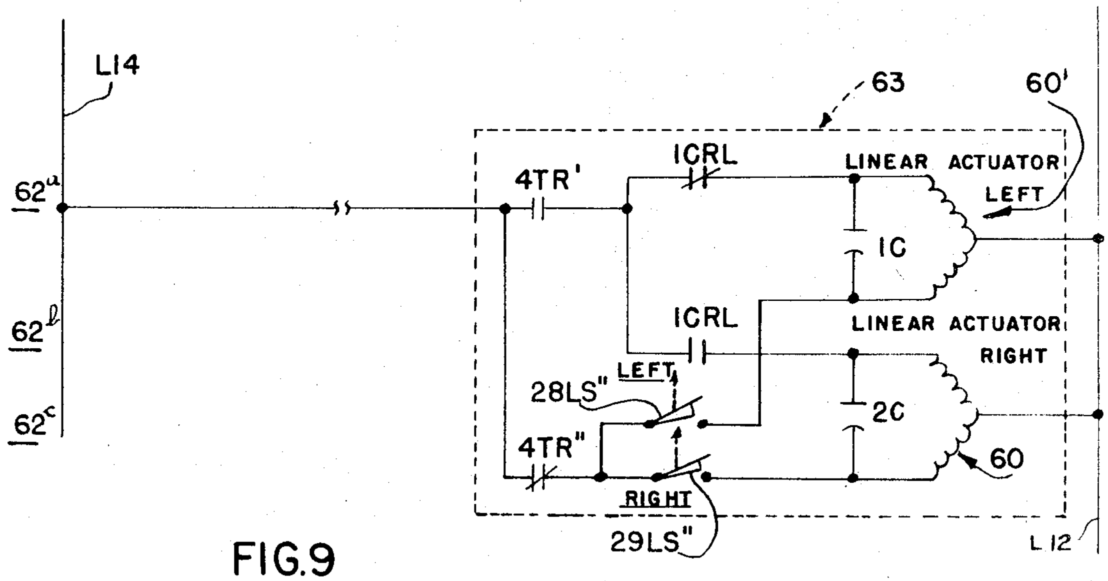

FIG. 4 is a sectional, fragmentary view taken generally along the plane of line 4–4 of FIG. 3 looking in the direction of the arrows, and showing in phantom lines the extended active position of the support means of the load detecting device extended outwardly beneath the respective confronting storage bin or storage location; load detecting devices are illustrated at both ends of the extractor for servicing the respective confronting storage section;

FIG. 5 is a generally diagrammatic top sectional view of the elevator and load detecting devices of FIG. 4 taken generally along the plane of line 5–5 of FIG. 4, illustrating the position of the energy beam sensors, and with the extended position of the respective support members for the reflectors being illustrated in phantom lines;

FIGS. 6 and 7 are schematics of portions of the control circuitry for controlling the automatic operation of the load carrier in its procedure of handling loads in the storage system, and with such views corresponding in general to respectively FIGS. 9B and 9E of the copending U.S. Pat. application, Ser. No. 418,048 in the name of Sanford Saul filed Dec. 14, 1964 and entitled Electrical Control Circuit for an Automatic Warehousing System, but with the addition thereto of circuitry for the operation of the load detecting mechanism, to determine if a load already occupies the selected storage location; in FIG. 7 there is shown by means of phantom line polygons the locations in such circuitry of the additional circuitry;

FIG. 8 is an enlarged detailed illustration of the circuitry added in the phantom line polygon shown in lines 48 and 49 of FIG. 7;

FIG. 9 is an enlarged detailed illustration of the circuitry inserted in the phantom line polygon shown in line 62*a* of FIG. 7, with such circuitry showing the controls and actuators for operation of the aforementioned reflector support means of the load detecting mechanism.

REferring now again to the drawings, the warehousing system illustrated comprises a skeletal storage structure or framework 10 comprised, in the embodiment illustrated, of parallel storage bank sections 12 and 14, defining therebetween a travel zone or aisle 16, so as to permit a motorized load carrier, indicated generally at 18, to be moved along the aisle or travel zone 16 and to insert and withdraw loads or articles from the storage bins or storage locations 19, formed by the respective storage sections 12 and 14.

Figure 1:
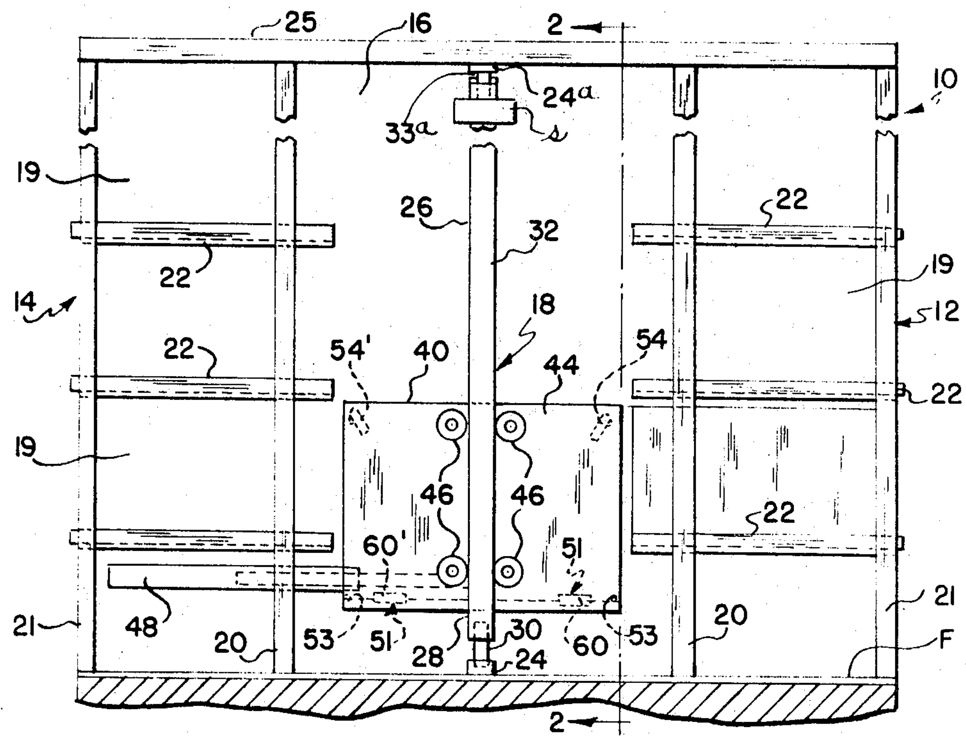
Figure 2:
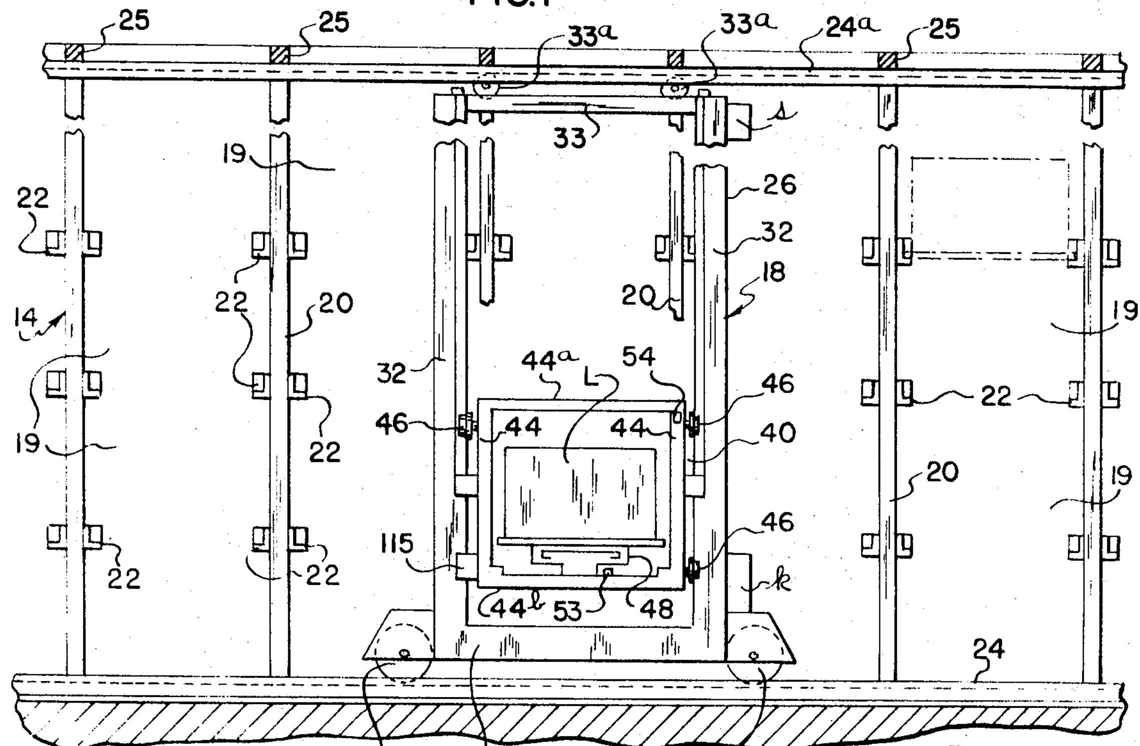
FIG. 2 is a side elevational view of the structure taken generally along the plane of line 2–2 of FIG. 1 looking in the direction of the arrows.

Each storage section may be constructed of a plurality of vertically extending posts, including aisle posts 20 and outer posts 21, spaced apart and connected by a plurality of generally horizontally extending load supporting members or rails 22, and defining the aforementioned storage bins 19. The load supporting members 22 have open load receiving ends defining a generally vertical plane along which the load carrier 18 is adapted for movement, with horizontally aligned pairs of the load supporting members 22 being adapted to receive the edges of a load in bridging relationship thereacross (FIG. 2) for supporting the load on the storage structure. The instant arrangement of warehousing storage frame structure may be generally similar to that disclosed in U.S. Pat. No. 3,371,804, issued Mar. 5, 1968 to A.R. Chasar and entitled Automatic Warehousing System, and reference may be had thereto for a more detailed description of suitable storage frame construction.

The load carrier 18, in the embodiment illustrated, is mounted upon a base rail 24 extending lengthwise of the travel zone 16 and carried by the floor F of the warehouse, with load carrier 18 being stabilized, in the embodiment illustrated, at the upper end thereof by an overhead rail 24*a* carried by cross members 25 extending between storage sections 12 and 14. Rails 24, 24*a* preferably extend outwardly of the storage sections at one end thereof for the positioning of the load carrier in front of the storage sections, and at a pickup and discharge station or stations (not shown) from which position the load carrier may start its movement into the aisle or travel zone, to deposit and/or pick up loads in the storage sections.

The load carrier 18 may comprise a generally horizontally movable conveyor portion of frame 26, which is of generally vertically elongated construction extending, in the embodiment illustrated, for substantially the full height of the storage structure and which comprises, in the embodiment illustrated, a lower carriage portion 28 having generally centrally oriented wheels 30 rotatably mounted thereon for supporting the load carrier on the lower rail or track 24. Conveyor portion 26 may also include generally vertically extending mast structure comprising longitudinally spaced vertical track members 32 extending upwardly from the carriage portion 28, and with the mast tracks 32 being coupled at their upper ends by transverse portion 33, which may mount guiding rollers or wheels 33*a* thereon for coaction with aforementioned upper rail 24*a*. Conveyor portion 26 may be driven horizontally along the tracks 24, 24*a* by means of a preferably reversible electric motor *k* operatively coupled to a least one of the wheels 30.

Load carrier 18 also comprises a vertically movable elevator 40 which is adapted for movement along the vertical masts 32 of the conveyor portion. Suitable power means such as an electric motor *s* may be carried by the conveyor portion, with such motor being operatively coupled to the elevator 40 in a known manner, for actuating the elevator in its vertical movement. The elevator 40, in the embodiment illustrated, comprises generally vertically extending end wall sections 44 and transversely extending cross members 44*a*, 44*b* (FIGS. 3,4 and 5) secured to the end wall sections 44 and typing the latter together. Elevator portion 40 may also comprise vertically spaced sets of rollers 46, rotatably mounted thereon and adapted for rolling coaction with the aforementioned vertical tracks 32 of the mast structure, for guiding the vertical movement of the elevator portion with respect to the conveyor portion 26 of the load carrier.

Mounted on the elevator portion 40 may be an extractor 48, which is adapted to move laterally of the elevator with a load L (FIG. 3) for depositing the load in a selected storage bin or storage location of the storage structure, or to move laterally of the elevator and pick up a load that is already in the storage structure and move it to another location in the storage structure or back to a pickup and discharge station of the warehousing system. The extractor portion 48 preferably provides an extensible table with the table being extendable in either of the opposed directions transverse to the longitudinal direction of movement of the load carrier in the travel zone, so as to locate the extractor within either of the storage sections associated with the travel zone effective to place the extensible table into position to deposit a load into or remove a load from the selected storage bin in the selected storage section. Suitable power means such as, for instance, a reversible electric motor 115 (FIG. 3) may be provided operably coupled to the extractor portion for actuating the latter. Reference may be had to the aforementioned U.S. Pat. application Ser. No. 418,048 for a more detailed discussion of a suitable extractor mechanism.

When depositing a load in one of the storage bins or storage locations of the storage structure, the elevator 48 and associated extractor may be located opposite the selected storage bin such that as the load is moved into the selected bin, the upper load supporting surface of the extractor is slightly above the horizontal flanges of the load supporting rails 22 mounted on the sides of the posts 20, 21, and defining the bottom extremity of the selected bin. When the load is completely within the confines of the bin the extractor may be lowered slightly, to deposit the load onto the load supporting rails 22 and permit retraction of the extractor back to its generally centered position with respect to the elevator. Conversely, when it is desired to remove a load from the selected bin, the extractor on the elevator is located such that the top surface of the extractor is extended into the bin slightly below the load to be picked up. Thereafter the extractor may be raised so as to lift the load off its supporting rail members and then the extractor can be returned to its original generally centered position with the load, preparatory to moving the load carrier to its next position in the load handling cycle.

In accordance with the present invention there is provided load detecting mechanism 51 for determining if a selected load storage bin or storage location contains a load, prior to lateral movement of the extractor to deposit a load into the selected bin. Load detecting mechanism is preferably mounted on the elevator at both ends of the extractor, so as to provide load detection for both storage sections, and as illustrated. Such load detecting mechanisms are substantially identical in construction with the mechanism on the left-hand side of the elevator being identified with identical reference numbers as that on the right except with the suffix "prime" (') being added thereto. Each load detecting mechanism includes a support means 53, 53' (FIGS. 4 and 5) mounted on the elevator and in the embodiment illustrated below and to one side of the extractor portion, and adapted for movement from an inactive position wherein the support member is disposed within the confines of the elevator, to an active position wherein the support member projects outwardly from the associated side of the elevator and into underlying relationship with respect to the selected storage bin (FIG. 4). Each support member 53 or 53' supports a reflector member or button 53*a* or 53*a'* adjacent its outer end with such reflector member being adapted to reflect back an energy beam, such as a beam B of light, from light source and associated photocell 54 or 54' mounted on the elevator, for actuating the respective photocell 1PE or 2PE (FIG. 8). The light source and associated photocell units 54, 54' are preferably adjustably mounted on the elevator as by means of adjustable bracket mechanism 58, for adjusting the incidence of the projection of the light beam. It will be seen that the light beam B is directed at an angle from the side of the elevator to the reflector 53*a* or 53*a'* on the support member, and in a manner that is not interfered with by the elevator structure or by the storage frame structure, when the support member is extended outwardly below the selected storage bin, and in the space between the load supports 22 defining the bottom extremity of such bin.

The linearly movable support member 53 or 53' of the detecting mechanism is actuated in the embodiment illustrated, by a single phase, capacitance start, linear motor 60 or 60' which when energized cause outward movement of the support member from its inactive position, shown in full lines in FIG. 4, to an active position as shown in phantom lines in FIGS. 4 and 5, thus placing the associated reflector member 53*a* or 53*a'* in position below the selected storage bin, for coaction with the energy beam from the light source 54 or 54' on the elevator. Return movement of the support member from its active position to its inactive position is caused by energization of the motor 60 or 60' in the reverse direction and as will be hereinafter described.

The programmed operation of a load handling cycle for the load carrier may be controlled by an electrical control circuit generally similar to that disclosed for instance in the aforementioned U.S. Pat. application Ser. No. 418,048 of Sanford Saul, and reference may be had thereto for a detailed description of such a control system. For example, with the load carrier disposed at a pickup and discharge station in the system, the load carrier may be automatically moved into the aisle or travel zone and located opposite the selected storage bin in either of the storage sections. At each programmed storage bin during the controlled interval, the extractor is adapted to be actuated so that the load will be deposited into or withdrawn from the bin. The load carrier may be programmed from a control console (not shown) on the load carrier, or the load carrier may be programmed from a location remote from the load carrier for controlling the positioning of the load carrier in the warehousing system.

Referring now to FIGS. 6 through 9, there is illustrated control circuitry for the load carrier so that the extractor motion for handling a load and for deposition a load into a selected storage bin location, will be permitted only after the load detecting mechanism has signalled that the selected storage bin is empty. In this connection limit switches 28LS and 29LS are provided on the elevator and which coact with the inner end of the respective linearly movable support member 53, 53' for controlling the associated motor 60 and 60' operating the respective support member. Referring now specifically to FIG. 6, it can be seen that in line 20 thereof, the contacts 28LS' and 29LS' of limit switches 28LS and 29LS respectively are in circuit with the 13LS limit switch, which switch contact 13LS in line 20 is maintained closed in the generally centered relationship of the extractor on the elevator. Movement of the extractor from centered relationship laterally outwardly to handle a load at a selected load storage location causes opening of switch contact 13LS in line 20. The switch contacts 28LS' and 29LS' are maintained in closed position by the associated support member in the inactive position of the latter, while in FIG. 9 the switch contacts 28LS'' and 29LS'' of respectively limit switch 28LS and 29LS are maintained in open position by the associated movable support member 53 or 53' in the inactive position of the latter. When the respective support member moves outwardly toward an active position from its inactive position, the switch contacts 28LS', 29LS' (line 20, FIG. 6) of the respective switch 28LS, 29LS open, while the switch contacts 28LS'', 29LS'' of the respective switch close.

Operation of the positioning circuitry for the load carrier may be the same as described in aforementioned Serial No. 418,048, so that as the load carrier moves in the aisle or travel zone in its load handling cycle the load carrier will be automatically positioned in front of a selected storage bin or storage location, at which time a readout occurs and power is adapted to be applied to the extractor motor 115 for the extractor mechanism for performing its load handling operation. Referring now to FIG. 7 which corresponds in general to FIG. I9E of Ser. No. 418,048 except for the added circuitry in the phantom lined polygons 61 and 63 in the lines 47*a* and 62*a* thereof, when limit switch contact 8LSH (line 49) is closed due to positioning of the elevator "high" for depositing a load into the selected storage location, and with timer relay contact 2TR (line 49) being in closed condition, the coil of either motor relay 3MR or 3ML (lines 49 and 50) is adapted to become energized effective to power the drive motor 115 of the extractor to extend the extractor into the selected confronting bin or storage location. However, referring now to FIG. 8, which illustrates in detail the circuitry disclosed in the phantom line rectangle 61 in the line 47*a* of FIG. 7, it will be seen that since relay 2CRL has been previously energized due to the closing of the 3TR contact in line 52 of FIG. 7, that the normally-closed contact 2CRL (line 49*a* of FIG. 8) is open and also the normally-open contact 20CR' (line 49, FIG. 8) is open, so that current cannot be supplied to the motor relay coils 3ML and 3MR. However, the normally-open contact 2CRL' in line 47*b* of FIG. 8 will have closed due to the aforementioned energization of relay 2CRL, and thus timer relay 4TR will become energized. Moreover, and as can be seen from FIG. 8, current is supplied via circuit lead 65 to the photocells 1PE and 2PE of units 54, 54' energizing the light sources thereof.

Referring now to FIG. 9, energization of timer relay 4TR as aforedescribed causes closing of the instantaneous normally-open 4TR' contact in line 62*a* of FIG. 9 and opening of instantaneous normally closed contact 42TR'' (line 62*c*, FIG. 9) thus supplying current from line L14 to the actuators 60, 60'. Since in the example illustrated, the actuator 60' for the left-hand movable support member 53' is in circuit with normally-closed contact 1CRL, such left-hand actuator 60' will be actuated to cause outward extension of the support member 53' thus placing the associated reflector member 53*a'* in alignment with the light source 54' and below the confronting bin. If the extractor had been programmed to extend right instead of left, for depositing a load into the right-hand storage section 12, then the normally-open relay contact 1CRL in line 62*b* of FIG. 9 would have been closed (with contact 1CRL in line 62*a* being open) to cause energization of the right-hand actuator 60 instead of the left-hand actuator 60'. When the beam of light from the light source is reflected back from reflector 53*a'* to the associated photocell 1PE (FIG. 8) the photocell is energized thus causing energization of photocell control relay 1CRPE which in turn causes the normally-open contacts 1CRPE' in line 47*a* (FIG. 8) to close, thereby causing energization of control relay 20CR.

Energization of control relay 20CR causes normally-open relay contacts 20CR' (line 49, FIG. 8) and relay contacts 20CR'' (line 47a, FIG. 8) to close, thereby permitting energization in this case of extractor motor relay 3ML. Energization of relay 3ML powers the extractor to move laterally from the elevator to the left and into the confronting bin to deposit the load therein and as described in aforementioned Ser. No. 418,048. It will be seen that upon energization of relay 20CR as aforedescribed, relay contact 20CR''' in line 47b of FIG. 8 opens, thereby deenergizing timer relay 4TR.

Assuming that a load is already disposed in the selected storage location as shown for instance in FIG. 4. When the support member 53' moves outwardly from the elevator and beneath the storage bin it will be seen that the load already occupying the bin will prevent the energy beam from light source 54 from being reflected from the reflector 53a' and therefore the beam of light is not transmitted back to the photocell 1PE. In that event, photocell 1PE is not energized, and therefore photocell relay 1CRPE is not energized and therefore relay contacts 1CRPE' are not closed and energization of control relay 20CR does not occur. Accordingly, timer relay 4TR remains energized, and timer contact 4TR' (line 5, FIG. 6) closes after a predetermined period of time, say for instance 5 seconds, when the photocell 1PE is not energized by the light beam due to the blockage afforded by the load already in the selected storage bin.

Upon closing of timer contact 4TR' (line 5, FIG. 6) energization of reject relay 3CR (line 6, FIG. 6) will occur. Energization of control relay 3CR will cause relay 4CR (line 10, FIG. 6) to drop out. Deenergization of 4CR will cause control relays 2TR (line 16, FIG. 6) and 4TR (line 47b, FIG. 8) to drop out. 4TR' contact (line 67a, FIG. 9) opens and 4TR'' contact (line 67c, FIG. 9) closes. The motor actuator 60 or 60' (FIG. 9) is energized in the reverse direction until 28LS'' and 29LS'' limit switch contacts are opened. Deenergization of relay 4CR will also cause energization of timer relay coil 3TR (line 57, FIG. 7). When relay 3TR times out, the 3TR timer contact (line 58, FIG. 7) closes to energize relay coil 12CR (line 58, FIG. 7). Thus relays 1M Reverse and 1M–Fast (line 26, 27 respectively of FIG. 9C of Ser. No. 418, 048) and relay 2M–Down and 2M–Fast (lines 44 and 45 respectively of FIG. 7) are energized and the load carrier is moved back to its starting position, which may be, in the embodiment illustrated, the aforementioned pickup and discharge station.

Referring to FIG. 9, it will be seen that when 4TR is deenergized as aforedescribed due to the opening of normally closed contact 20CR''' (line 47b, FIG. 8) and due to the fact that the limit switch contact 28LS'' (FIG. 9) has closed when the associated support member 53' moved outwardly beneath the confronting bin, then the motor actuator 60' is energized to return the support member back to retracted or inactive position on the elevator. Likewise when the energy beam from light source is interrupted due to a load in the selected bin and the reject relay 3CR is energized as aforedescribed and the light beam is not able to be reflected off the associated reflector, and the associate photocell 1PE is not energized, when 4TR times out as aforedescribed, thus causing relay contact 4TR'' (line 62c, FIG. 9) to close, the extended support member 53 and 53' is returned to its inactive position by the associated actuator. Thus the support member is in its inactive position and out of interfering relationship with respect to the storage structure, and the load carrier is moved as aforedescribed to its starting position, without damage or interference to the load detecting mechanism.

As will be apparent, the light sources of the photocell units 54, 54' are energized only when the elevator has moved to a position preparatory to handling a load at the selected bin by the extractor, thus giving a longer life to the light sources. The photocell beam must be completed to the photocell to cause energization of the extractor, and thus any failure in the detection system, such as for instance a burned out bulb in the light source, will prevent extractor movement, thus resulting in "-fail-safe" operation. The reflector member is moved into the space in the storage structure that is conventionally used by the extractor when entering a selected storage bin in "low" position to pick up a load, and thus no extra space in the storage structure is required, making it possible to use the load detector with existing warehousing systems. Since the support member and associated reflector are extended a relatively small distance under the position of a stored load and do not contact a stored load, the mechanism is not subject to damage, such as occurs when striking an object. As can be seen from FIG. 6, when the support member moves from is inactive position toward active position, the load carrier is prevented from moving horizontally and vertically from the selected storage bin.

From the foregoing discussion and accompanying drawings it will be seen that the invention provides an automatic warehousing system having an energy beam load detecting device controlling the actuation of the extractor of the powered load carrier and permitting actuation of the extractor only when the energy beam is received by the energy beam sensor and wherein the energy beam can be received by the energy beam sensor only when the selected storage bin is empty. The load carrier is provided with control means which are operable to return the load carrier to its starting position in the event that the energy beam is not received by the energy beam sensor. The load detecting means for determining whether or not a load is already stored in the selected storage bin includes means movable into position under the selected storage location or bin, with the movable means being adapted for coaction with the energy beam sensor for checking to see whether or not a load is already in the selected load storage location.

The terms and expressions equivalents have been used are used as terms of description and not of limitation, and there is no intention in the use of such terms and expressions of excluding and equivalents of any of the features shown or described and it is recognized that various modifications are possible within the scope of the terms and expressions used.

We claim:

1. In a warehousing system comprising a storage frame having a plurality of load storage locations therein for receiving loads and a movable load carrier for inserting loads into and withdrawing loads from said storage frame, said load carrier comprising, an extractor movable into a selected load storage location for handling a load thereat, circuit means for controlling the operation of said extractor, load detecting means on said load carrier for determining if said selected storage location is occupied by a load prior to load depositing actuation of said extractor to place a load in said selected storage location, said load detecting means including means movable from an inactive position to an active position in said storage frame into coacting relation with said selected storage location, said movable means including reflector means mounted thereon and sensing means generally stationary relative to said movable means and including a light source adapted for coaction with said movable means in said active position of the latter, said reflector means being adapted to reflect light back to said sensing means to energize the latter in he event that the selected storage location is empty, and said circuit means including means responsive to energization of said sensing means to cause load depositing actuation of said extractor.

2. A system in accordance with claim 1, wherein said movable means comprises an arm member movable into and out of said storage frame below said selected storage location said reflector means being mounted on said arm member.

3. A system in accordance with claim 1 wherein said load carrier includes a vertically movable elevator with said extractor being mounted on said elevator for lateral movement with respect thereto, and wherein said movable means is movably mounted on said elevator at a level downwardly from the upper level of said extractor.

4. A system in accordance with claim 1 wherein said sensing means comprises a reflex photocell unit and said reflector means includes a retroreflective member for directing the beam of light from the light source of said photocell unit back along the same axis as the beam of light from said source.

5. A system in accordance with claim 2, wherein said sensing means comprises a photoelectric cell and a light source and said reflector means comprises a reflector button mounted adjacent the outer end of said arm member and adapted to be disposed in the path of the light source in said active position of said movable means for directing the light energy beam back to said photoelectric cell.

6. A system in accordance with claim 2 wherein said sensing means is disposed in said circuit means, said circuit means including electroresponsive control means, and wherein said sensing means controls certain of said electroresponsive control means which in turn control said power means for preventing actuation of said extractor in the event that said sensing means is not energized.

7. A system in accordance with claim 2, wherein said arm member is disposed beneath said extractor, and means for actuating said arm member and moving the latter linearly outwardly from said elevator into said active position beneath the selected load storage location.

8. A system in accordance with claim 2, wherein said load carrier comprises a horizontally movable conveyor portion, an elevator portion movable vertically with respect to said conveyor portion and said extractor being mounted on said elevator portion for movement laterally with respect thereto, power means for operating said conveyor portion, said elevator portion and said extractor, circuit means coupled to said power means, and control means in said circuit means coacting with said arm member for preventing predetermined movement of said conveyor and elevator portions when said arm member is in said active position.

9. A system in accordance with claim 1, wherein said load carrier comprises a longitudinally movable conveyor portion and an elevator portion movable vertically with respect to said conveyor portion, said extractor being mounted on said elevator portion for lateral movement with respect thereto, said movable means comprising a linearly movable arm mounted on said elevator portion and adapted for movement from said inactive position within the confines of said elevator portion of said active position wherein said arm projects laterally from said elevator portion and underlies the lower extremity of said selected storage location, a reflector member comprising said reflector means supported on said arm, said sensing means being mounted on said elevator portion in upwardly spaced relation with respect to said arm.

10. a system in accordance with claim 6 including electrical means for actuating said actuating said arm member and moving the latter outwardly from said load carrier into said active position, and wherein said circuit means includes electroresponsive timer means for controlling the actuation of said arm actuating means and causing the latter to return said arm member to said inactive position.

11. A system in accordance with claim 6 wherein said circuit means includes means operable to cause said load carrier to return to its starting position in the event that said sensing means is not energized when said arm member moves to said active position and after said arm member returns to said inactive position from said active position.

12. A system in accordance with claim 7, wherein said means for actuating said arm member comprises an electric linear motor for extending said arm member to said active position and retracting it back to said inactive position.

13. A system in accordance with claim 12 including switch means mounted on said load carrier and coacting with said arm member for controlling the operation of said motor for returning said arm member to said inactive position.

14. A system in accordance with claim 2 wherein said storage frame comprises laterally spaced storage sections defining an aisle therebetween in which said load carrier is adapted to move, said load carrier comprising a longitudinally movable conveyor portion and an elevator portion movable vertically with respect to said conveyor portion, said extractor being supported on said elevator portion for lateral movement with respect thereto and into and out of the selected storage section, said load detecting means comprising a pair of said arm members mounted adjacent opposite sides of said elevator and adjacent the respective end of said extractor, means for programming the extractor for movement into a selected one of said storage sections, and means for controlling the actuation of said arm members responsive to the direction of lateral programmed movement of said extractor from said elevator portion.

15. A system in accordance with claim 13 wherein said switch means includes means for preventing predetermined horizontal and vertical movement of said load carrier when said arm member moves from said inactive position toward said active position.

16. A system in accordance with claim 1 including motor means for actuating said movable means from said inactive position to said active position and vice versa, and switch means mounted on said load carrier and coacting with said movable means for controlling operation of said motor means for returning said movable means to said inactive position.

17. A system in accordance with claim 1 wherein said load carrier is movable horizontally and vertically for positioning said extractor with respect to a selected load storage location, and means for preventing predetermined horizontal and vertical movement of said load carrier when said movable means moves from said inactive position toward said active position.